US008239581B2

(12) United States Patent
Ibarra et al.

(10) Patent No.: US 8,239,581 B2
(45) Date of Patent: Aug. 7, 2012

(54) DATA STORAGE DEVICE COMPATIBLE WITH MULTIPLE INTERCONNECT STANDARDS

(75) Inventors: Gabriel Ibarra, Longmont, CO (US); William L. Rugg, Longmont, CO (US); Nicholas C. Seroff, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 12/777,236

(22) Filed: May 10, 2010

(65) Prior Publication Data

US 2010/0223416 A1 Sep. 2, 2010

Related U.S. Application Data

(63) Continuation-in-part of application No. 12/410,360, filed on Mar. 24, 2009.

(60) Provisional application No. 61/127,808, filed on May 15, 2008.

(51) Int. Cl.
*G06F 13/00* (2006.01)

(52) U.S. Cl. .......... 710/2

(58) Field of Classification Search .......... None
See application file for complete search history.

(56) References Cited

U.S. PATENT DOCUMENTS

| | | | | |
|---|---|---|---|---|
| 4,686,506 | A | 8/1987 | Farago | |
| 5,741,151 | A * | 4/1998 | Youngers | 439/489 |
| 6,719,591 | B1 | 4/2004 | Chang | |
| 6,886,057 | B2 | 4/2005 | Brewer et al. | |
| 6,888,727 | B2 | 5/2005 | Chang | |
| 6,895,447 | B2 | 5/2005 | Brewer et al. | |
| 7,021,971 | B2 | 4/2006 | Chou et al. | |
| 7,104,848 | B1 | 9/2006 | Chou et al. | |
| 7,108,560 | B1 | 9/2006 | Chou et al. | |
| 7,124,152 | B2 | 10/2006 | Fish | |
| 7,125,287 | B1 | 10/2006 | Chou et al. | |
| 7,182,630 | B1 | 2/2007 | Su | |
| 7,182,646 | B1 | 2/2007 | Chou et al. | |
| 7,186,147 | B1 | 3/2007 | Chou et al. | |
| 7,207,831 | B2 | 4/2007 | Chen | |
| 2006/0174049 | A1 | 8/2006 | Lin et al. | |
| 2008/0200072 | A1 * | 8/2008 | Cheong | 439/660 |

OTHER PUBLICATIONS

SATA-IO, Serial ATA Revision 2.6, 2007, pp. 1-600.*
Lenovo, Road Warriors Get Ready—Lenovo Delivers "No Compromises" Ultraportable ThinkPad X300 Notebook PC, Feb. 2008, http://www.lenovo.com/news/us/en/2008/02/x300.html.*
Universal Serial BUs Specification, 2000, Rev 2.0, pp. 120, 131, 141.*

(Continued)

*Primary Examiner* — Cheng-Yuan Tseng
(74) *Attorney, Agent, or Firm* — Mitchell K. McCarthy

(57) ABSTRACT

A data storage device comprises a data storage medium; an interface between the data storage medium and a host device configured to provide connectivity according to a plurality of storage interconnect standards. The data storage device also includes a interconnect detector configured to determine the presence of a physical connection to the host device and identify an interconnect standard of the host device, wherein the interconnect standard of the host device is one of the plurality of storage interconnect standards; and a controller configured to: receive an indication of the interconnect standard of the physical connection from the interconnect detector, receive data access commands in accordance with the interconnect standard from the host device via the connector; process the data access commands by accessing the data storage medium; and send a response to the data access commands in accordance with the interconnect standard to the host via the connector.

20 Claims, 9 Drawing Sheets

OTHER PUBLICATIONS

Serial ATA Internal Organization: Serial ATA Revision 2.6, 2007, pp. 30,161-162.*

Taiwan Engineering Center "Design Verification for ESATA+USB 2 in 1 Connector Rev.O" Jul. 3, 2006 (3 pages).

WWW.Everythingusb.com "USB Header Adapter Adds Internal USB Ports" Apr. 5, 2007, (1 page).

Elliott, Rob "Serial Attached SCSI General Overview, HP Industry Standard Servers Server Storage Advanced Technology" HP Invent, Sep. 30, 2003 (88 pages).

WWW.cooldrives.com/seatatousb20.html "Serial ATA to USB 2.0 Adapter Cable" Dec. 11, 2008, (12 pages).

Joint Proposal from Silicon Image, Seagate and Taiwin Electronics "eSATAp or Power over eSATA proposal" Apr. 27, 2007, (2 pages).

Taiwin Electronics Co., LTD, "External Serial ATA and USB 2 in 1" (2 pages).

Hewlett Packard Company et al., "Universal Serial Bus 3.0 Specification" Revision 1.0, Nov. 12, 2008, (482 pages).

Compaq et al., "Universal Serial Bus Specification" Revision 1.1, Apr. 27, 2000, (327 pages).

Compaq et al., "Universal Serial Bus Specification" Revision 2.0, Sep. 23, 1998, (650 pages).

* cited by examiner

DATA STORAGE DEVICE COMPATIBLE WITH MULTIPLE INTERCONNECT STANDARDS

This application is a continuation-in-part of U.S. patent application Ser. No. 12/410,360, filed Mar. 24, 2009, which claims the benefit of U.S. Provisional Application No. 61/127,808, filed May 15, 2008. The entire contents of both U.S. patent application Ser. No. 12/410,360 and U.S. Provisional Application No. 61/127,808 are incorporated by reference herein.

BACKGROUND

Different data storage devices, such as solid state memory devices and disc drives, may connect to a host device, such as a computer, a personal media player or a network device, according to one of a variety of interconnect standards. An interconnect standard defines both electrical and mechanical interfaces, and the electrical and mechanical interfaces for an interconnect standard are generally exclusive to that interconnect standard.

Interconnect standards include both internal interconnect standards, i.e., standards intended for connectivity between a host device an data storage device contained within a housing of the host device, as well as external interconnect standards, i.e., standards intended for connectivity between a host device and a data storage device externally located relative to the host device. Examples of internal interconnect standards include Serial Advanced Technology Attachment (SATA) standards, integrated drive electronics (IDE) standards, Small Computer System Interface (SCSI) standards, and Serial Attached SCSI (SAS) standards. Examples of external interconnect standards include Universal Serial Bus (USB) standards, IEEE-1394 (Firewire) standards, Fiber Channel (FC) standards, Internet SCSI (iSCSI) standards and External SATA (eSATA) standards.

SUMMARY

As one example, this disclosure is directed to a data storage device comprising a data storage medium; a connector that provides an interface between the data storage medium and a host device. The interface is configured to provide connectivity according to a plurality of storage interconnect standards. The data storage device also includes a interconnect detector configured to determine the presence of a physical connection to the host device and identify an interconnect standard of the host device, wherein the interconnect standard of the host device is one of the plurality of storage interconnect standards; and a controller configured to: receive an indication of the interconnect standard of the physical connection from the interconnect detector, receive data access commands in accordance with the interconnect standard from the host device via the connector; process the data access commands by accessing the data storage medium; and send a response to the data access commands in accordance with the interconnect standard to the host via the connector.

In another example, this disclosure is directed to a data storage device comprising: a data storage medium; a circuit board; one or more connectors coupled to the circuit board, wherein the one or more connectors are configured to provide connectivity with a host device in accordance with at least two distinct interconnect standards; an interconnect detector on the circuit board, wherein the interconnect detector is configured to determine the presence of a physical connection to the host device and identify an interconnect standard of the physical connection, wherein the interconnect standard of the physical connection is one of the least two distinct interconnect standards; and a controller on the circuit board. The controller is configured to: receive data access commands from the host device in accordance with the interconnect standard of the physical connection via the one or more connectors; process the data access commands by accessing the data storage medium; and send responses to the data access commands to the host in accordance with the interconnect standard of the physical connection.

In another example, this disclosure is directed to a method comprising: detecting a first voltage within a first conductor of a connector; associating the first voltage with a first interconnect standard; corresponding with a first host device via the connector using the first interconnect standard; detecting a voltage change from a baseline voltage to a contrasting voltage within a second conductor of the connector; associating the voltage change with a second interconnect standard; and corresponding with a second host device via the connector using the second interconnect standard.

These and various other features and advantages will be apparent from a reading of the following detailed description.

DETAILED DESCRIPTION

Figure 1A:
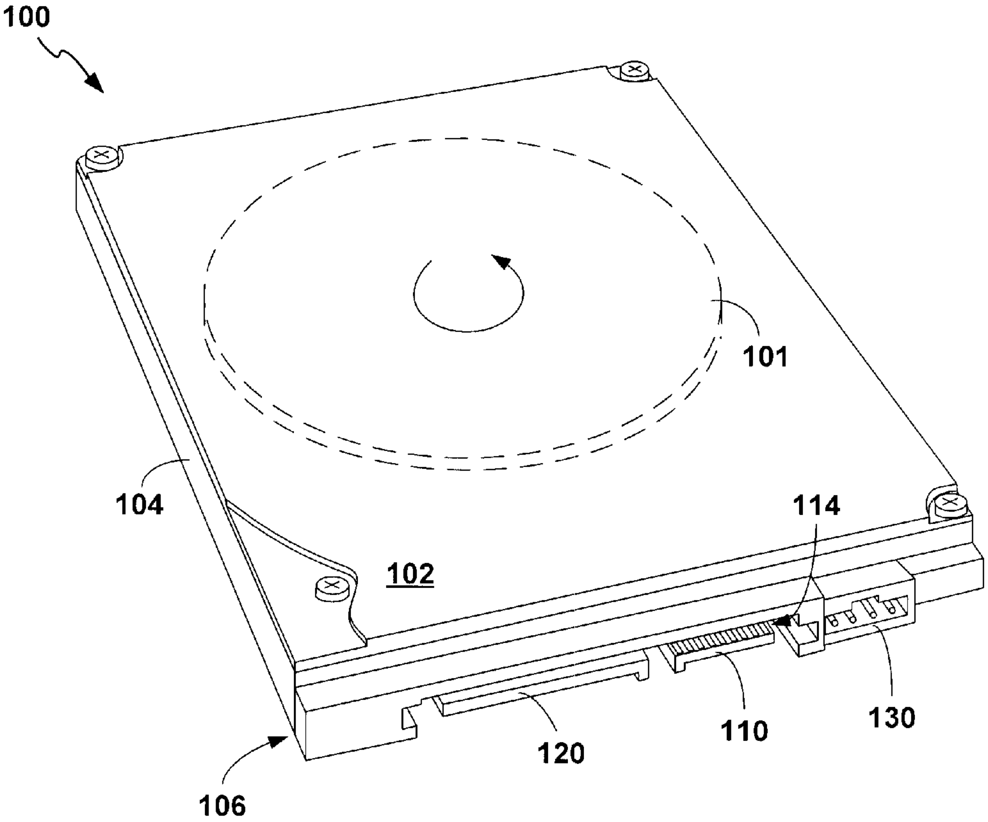
FIGS. 1A-1B illustrate a data storage device including a modified SATA connector having an extra set of electrical contacts configured to provide a USB connection.
Figure 1B:
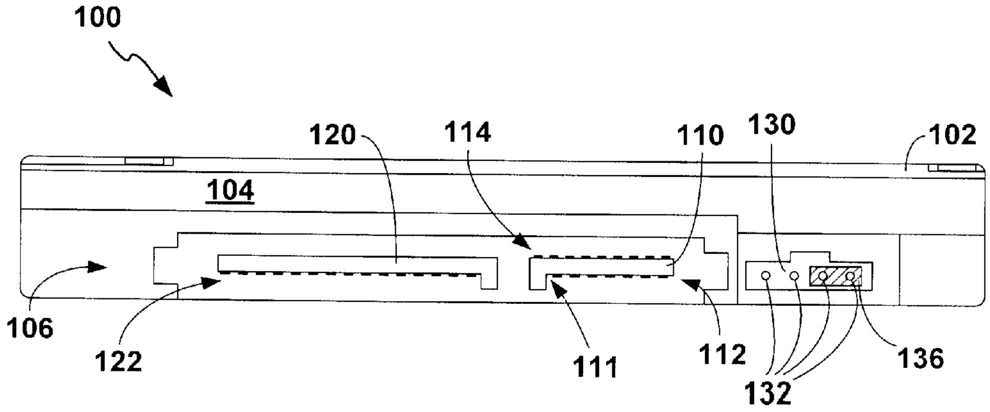
Figure 2:
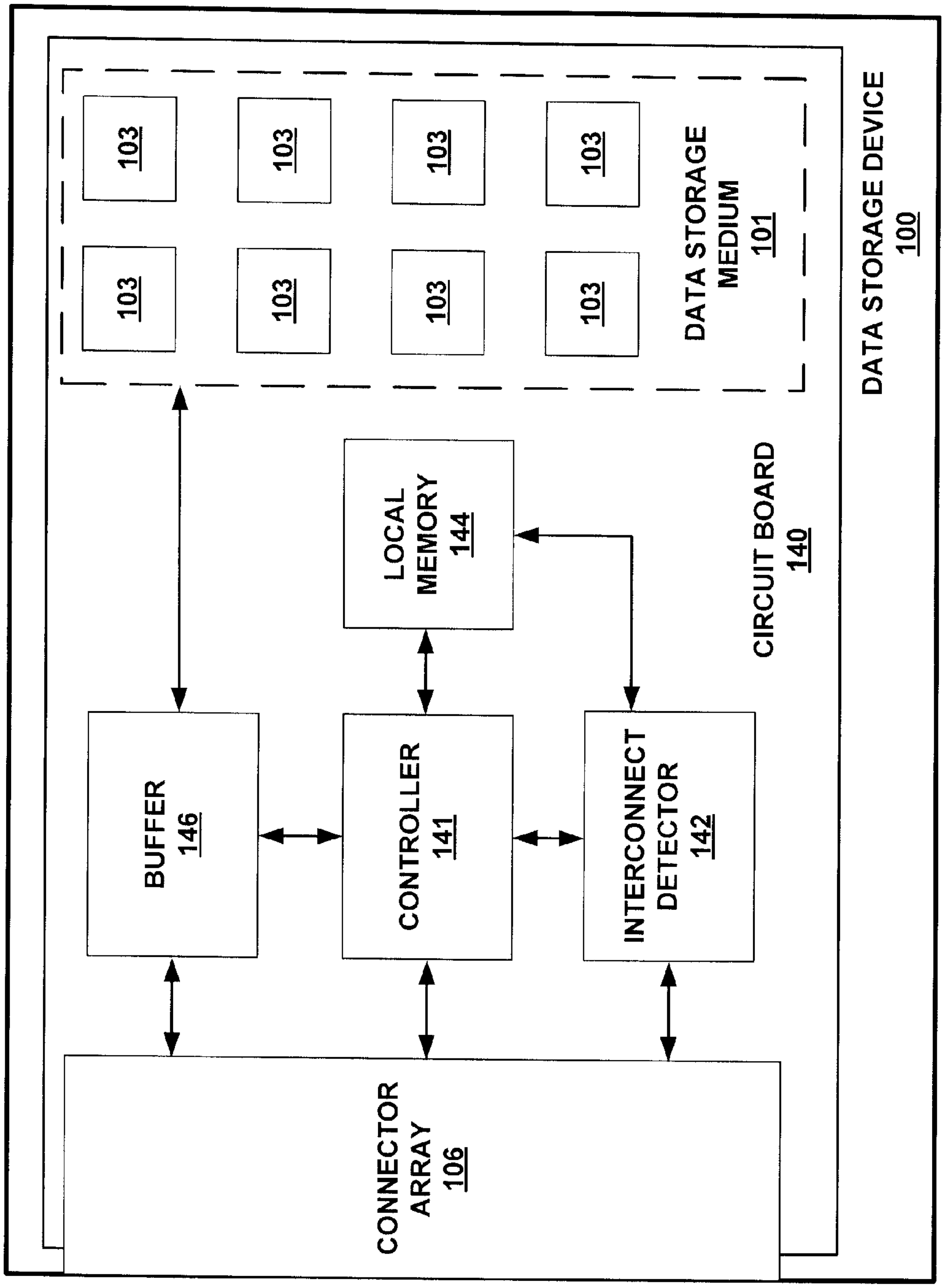
FIG. 2 is a conceptual block diagram of a data storage device compatible with multiple interconnect standards.

FIGS. 1A-1B illustrate data storage device 100. FIG. 2 illustrates a conceptual block diagram of data storage device 100. Data storage device 100 is compatible with multiple interconnect standards. Specifically, as shown in FIGS. 1A-1B, data storage device 100 includes a standard Serial Advanced Technology Attachment (SATA) connector array 106, including SATA power connector 120 and modified SATA connector 110. Connector 110 is a modified connector because it includes electrical contacts 114, which are in addition to the electrical contacts defined by a SATA interconnect standard, contacts 112. As will be described in greater detail below, data storage device 100 and electrical contacts 114 are configured to provide connectivity between data storage device 100 and a host device according to a USB standard.

Data storage device 100 includes base 104 and cover 102, which combine to form a housing containing data storage medium 101. As shown in FIG. 1A, data storage medium 101 may include a rotatable magnetic data storage disc. In addition, as shown in FIG. 2, data storage medium 101 may include solid state memory with one or more memory modules 103 mounted on circuit board 140. Examples of suitable data storage media include rewriteable magnetic data storage discs, solid state memory, such as flash memory, static random access memory (SRAM), and dynamic random access memory (DRAM). Other data storage media may also be used, and in some examples, data storage medium 101 may include more than one data storage medium. In different examples, data storage medium 101 may provide a data storage capacity of at least 10 gigabytes (GB), a data storage capacity of at least 20 GB, a data storage capacity of at least 40 GB, a data storage capacity of at least 100 GB, a data storage capacity of at least 200 GB, or even a data storage capacity of at least 500 GB.

Figure 4:
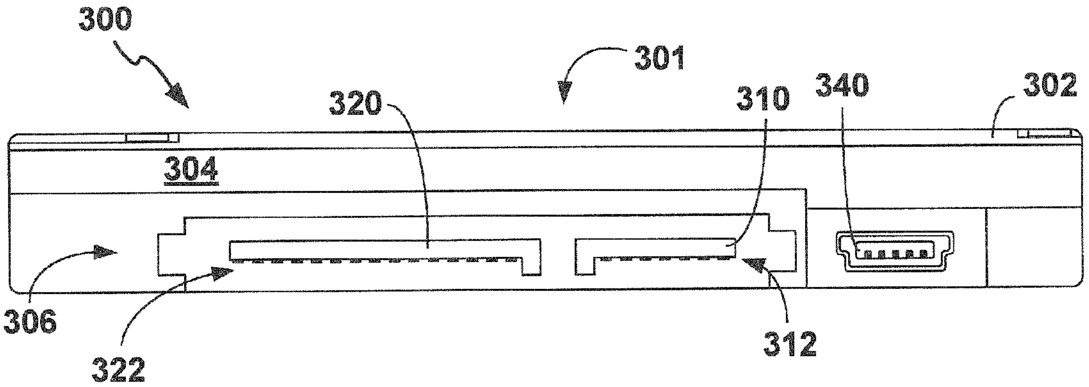
FIG. 4 illustrates a data storage device including a connector array including a SATA connector and a USB connector.

Data storage device 100 further includes connector array 106. Connector array 106 includes SATA power connector 120 including electrical contacts 122, modified SATA connector 110 and jumper module 130 with speed-select pins 132 with jumper 136. While jumper module 130 is shown as part of connector array 106, jumper module 130 may be positioned at any location on data storage device 100. For example, jumper module 130 may be positioned on the back of data storage device 100, opposite connector array 106. Such a configuration would facilitate space for additional connectors to be included with connector array 106. One such example is shown in FIG. 4, which includes a USB connector as part of a connector array.

Connector array 106, including the physical dimensions of SATA power connector 120 and modified SATA connector 110, substantially conform to a SATA standard provided by the SATA International Organization. As referred to herein, substantial conformance to an interconnect standard means that an interface provides functional connectivity with a mating interface that meets the interconnect standard. As of the filing of this application, the SATA International Organization has provided at least three specifications including: the SATA 1.5 GB/s specification, a SATA 3 GB/s specification and a SATA 6 GB/s specification. The SATA 6 GB/s specification is also referred to as, "Serial ATA International Organization: Serial ATA Revision 3.0," and was ratified by the SATA International Organization on or about Aug. 18, 2008. The entire contents of each of these SATA specifications are incorporated by reference herein. In other examples, a connector or connector array may substantially conform to a different internal interconnect standard such as an Integrated Drive Electronics (IDE) standard, also referred to as a Parallel Advanced Technology Attachment (PATA) standard, a Small Computer System Interface (SCSI) standard, a Serial Attached SCSI (SAS) standard and an ultra ATA standard. This list is not exhaustive and other internal interconnect standards may also be suitable in accordance with the techniques disclosed herein.

Modified SATA connector 110 is a male connector with an L-shaped cross-section including a long leg and a short leg that meet to form inside corner 111. Electrical contacts 112 are located on the long leg of the L-shaped cross-section on the same side of the long leg as inside corner 111. Electrical contacts 112 include seven separate electrical contacts configured in accordance with a SATA specification to provide connectivity with a host device according to the SATA specification.

Modified SATA connector 110 also includes electrical contacts 114, which constitute additional electrical contacts other than those provided for in a SATA specification. Electrical contacts 114 are located in on the long leg of the L-shaped cross-section on an opposite side of the long leg relative to inside corner 11. Electrical contacts 114 include nine separate electrical contacts to facilitate connectivity with a host device in accordance with an external interconnect standard, such as a USB standard as defined by USB Implementers Forum, Inc. As of the filing of this application, USB Implementers Forum, Inc. has published at least four specifications including: the USB 1.0 specification, the USB 1.1 specification, the USB 2.0 specification, and the USB 3.0 specification. The USB 3.0 specification, revision 1.0 was released on or about Nov. 12, 2008 by USB Implementers Forum, Inc. In addition, the USB 1.0 specification was released in or about January, 1996, the USB 1.1 specification was released in or about September, 1998, while the USB 2.0 specification was released in or about April, 2000. The entire contents of each of these USB specifications are incorporated by reference herein. In other examples, a connector or connector array may facilitate connectivity with a host device in accordance with a different external interconnect standard such as an IEEE-1394 (Firewire) standard, a Fiber Channel (FC) standard, an Internet SCSI (iSCSI) standard, and an External SATA (eSATA) standard. This list is not exhaustive and other external interconnect standards may also be suitable in accordance with the techniques disclosed herein. In some examples, a modified connector, such as connector 110 may instead facilitate connectivity according to multiple internal interconnect standards alternatively or in addition to facilitating connectivity according to one or more external interconnect standards.

Figure 6:
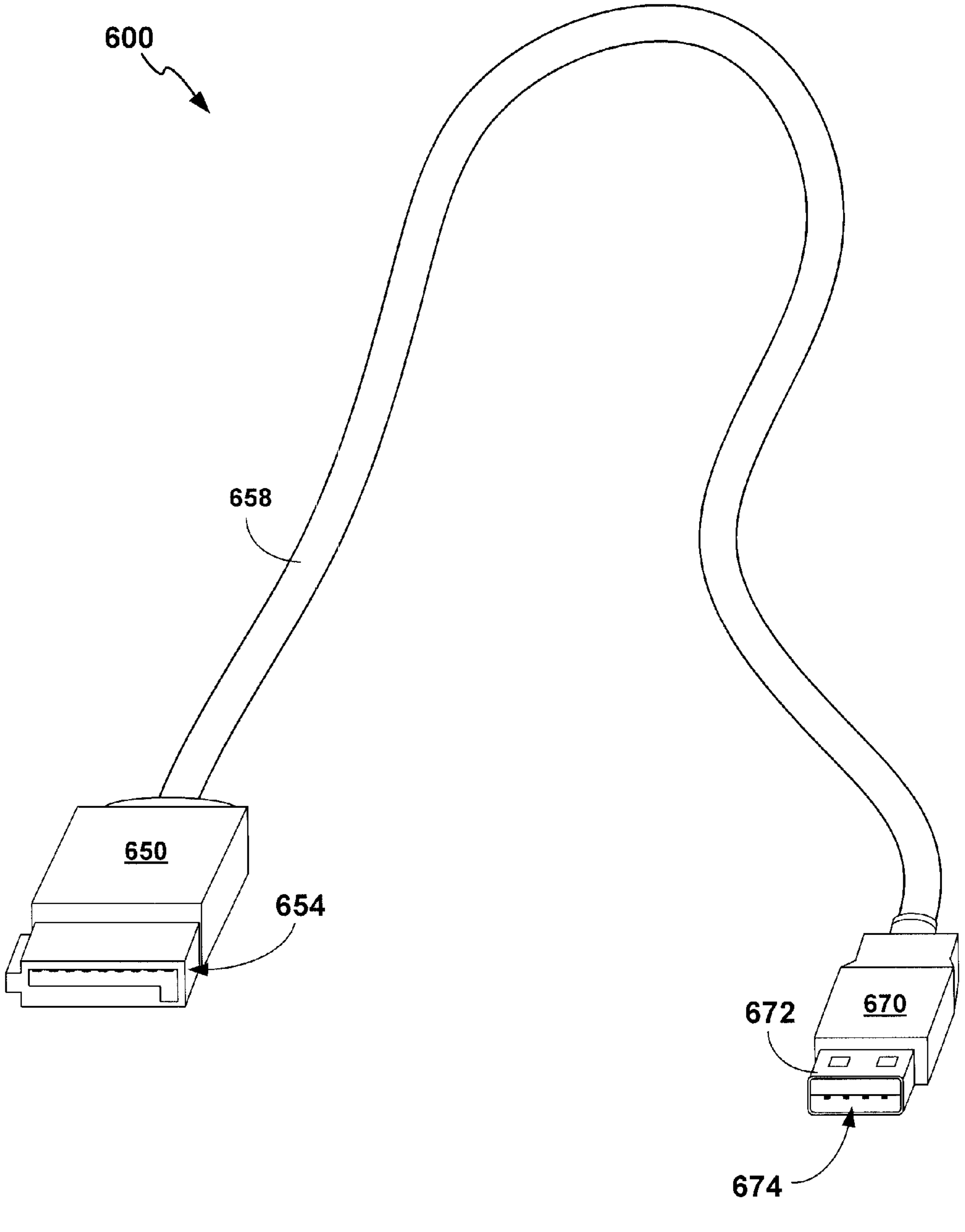
FIG. 6 illustrates a cable including a modified SATA connector and a USB connector.

As previously mentioned, electrical contacts 114 include nine separate electrical contacts to facilitate connectivity with a host device in accordance with an external interconnect standard, such as a USB standard. As an example, the USB 3.0 specification defines an interconnect standard that includes nine individual conductors. While the USB 3.0 specification includes nine electrical contacts, other external interconnect standards include different numbers of electrical contacts and the number of separate electrical contacts contained in electrical contacts 114 may be modified accordingly. Data storage device 100 may be configured to communicate using electrical contacts 114 and communication protocols associated with the USB 3.0 specification. Using a cable that converts the configuration of electrical contacts 114 to conform to a connector defined by an external interconnect standard, such as the USB 3.0 specification, data storage device 100 may be directly connected to a host device using the external interconnect standard. Cable 600, as shown in FIG. 6, is one example of such a cable.

Even with the addition of electrical contacts 114, connector array 106 is fully compatible with devices configured according to the SATA interconnect standard. For example, data storage device 100 can be directly mounted in a disc drive bay of a laptop computer configured according to the SATA interconnect standard. In such a configuration, the electrical connection between the laptop computer and data storage device may only include contacts 112, and not contacts 114. In other examples, an external interconnect standard may be used simultaneously with an internal interconnect standard, e.g., to connect data storage device 100 to more than one host device or to increase the data transfer rate between the data storage device 100 and the host device. As another example, data storage device 100 may be configured such that a host device may recognize data storage device 100 as two separate devices: one device that communicates via an internal interconnect standard and one device that communicates via an external interconnect standard. In any of these examples, a cable such as cable 500 (FIG. 5) may be used to provide electrical connections between data storage device 100 and a host device.

With reference to FIG. 2, upon initial connection to the host, interconnect detector 142 determines the presence of a physical connection to the host device and identifies an interconnect standard of the physical connection. For example, interconnect detector 142 may determine if the interconnect standard of the physical connection is a SATA standard or a USB standard or a combination thereof. Interconnect detector 142 stores an indication of the interconnect standard of the physical connection in local memory 144.

Following this initial connection, data storage device 100 receives data access commands, such as read or write commands, from a host device via modified SATA connector 110 in connector array 106. Incoming commands are processed by controller 141, which is mounted to circuit board 140. Controller 141 communicates with the host device in accordance with the interconnect standard of the physical connection as stored in local memory 144. Controller 141 operates in accordance with programming stored in local memory 144 to schedule execution of the data access commands. Buffer 146 temporarily stores data to be written to data storage medium 101 and temporarily stores data from data storage medium 101 pending transfer to a host. In some examples, the functionality of controller 141 and interconnect detector 142 may be included in a common integrated circuit mounted to circuit board 140.

Data storage device 100 provides numerous advantages over a data storage device that facilitates only a single interconnect standard. By facilitating multiple interconnect standards, data storage device may be used as both an internal data storage device an external data storage device. While such flexibility may be useful to a consumer, it may also be advantageous from a business and manufacturability standpoint. Manufacturing facilities for data storage devices represent significant investments. The flexibility provided by the multiple interconnect standards of data storage device 100 allows a manufacturer to supply both external or internal data storage devices as the market demands without altering its manufacturing facilities or production schedule. Post-production, a manufacturer may choose to constrain the functionality of data storage device 100 to only one of the interconnect standards facilitated by data storage device 100. Correspondingly, the manufacture may set different price points for the different interconnect standards data storage device 100 to maximize the profitability of data storage device 100. In addition, a manufacturer may modify data storage device 100 in manner suitable for its intended use. For example, a manufacture may add a shock absorption case to the exterior of data storage device 100 when intended to be used as an external data storage device or add mounting fixtures to the exterior of data storage device 100 when intended to be used as an internal data storage device.

Figure 3:
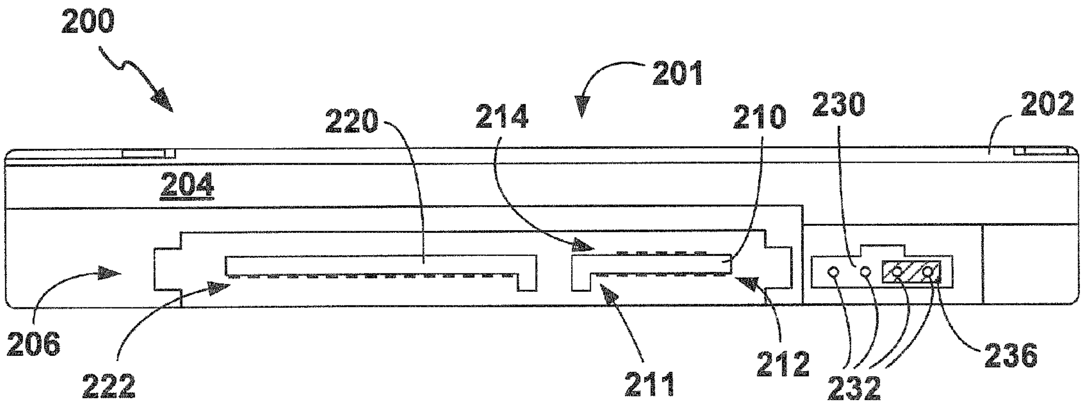
FIG. 3 illustrates an alternative example to the data storage device depicted in FIGS. 1A-1B.

FIG. 3 illustrates data storage device 200, which provides an alternative electrode configuration for modified SATA connector 210 relative to modified SATA connector 110 of data storage device 100. In other respects, data storage device 200 is substantially similar to data storage device 100. For brevity, some details of data storage device 200 that are the same or similar to details already discussed with respect to data storage device 100 are not repeated with respect to data storage device 200.

Like data storage device 100, data storage device 200 is compatible with multiple interconnect standards. Data storage device 200 includes a connector array 206 including SATA power connector 220 and modified SATA connector 210. Connector 210 is a modified connector because it includes electrical contacts 214, which are in addition to the electrical contacts defined by an SATA interconnect standard, contacts 212. Connector array 206 and modified SATA connector 210 substantially conform to a SATA standard. As will be described in greater detail below, data storage device 200 and electrical contacts 214 are configured to provide connectivity according to a USB standard.

Data storage device 200 includes base 204 and cover 202, which combine to form a housing containing data storage medium 201. Data storage medium 201 may be a rotatable magnetic data storage disc, solid state memory, or other data storage medium. Data storage device 200 further includes connector array 206. Connector array 206 includes SATA power connector 220 including electrical contacts 222, modified SATA connector 210 and jumper module 230 with speed-select pins 232 with jumper 236. Connector array 206, including the physical dimensions of SATA power connector 220 and modified SATA connector 210, substantially conforms to a SATA standard provided by the SATA International Organization.

Modified SATA connector 210 is a male connector with an L-shaped cross-section including a long leg and a short leg that meet to form inside corner 211. Electrical contacts 212 are located on the long leg of the L-shaped cross-section on the same side of the long leg as inside corner 211. Electrical contacts 212 include seven separate electrical contacts configured in accordance with a SATA specification to provide connectivity with a host device according to the SATA specification.

Modified SATA connector 210 includes electrical contacts 214, which constitute additional electrical contacts other than those provided for in a SATA specification. Electrical contacts 214 are located in on the long leg of the L-shaped cross-section on an opposite side of the long leg relative to inside corner 21. Electrical contacts 214 include seven separate electrical contacts. The combination of electrical contacts 214 with electrical contacts 212 facilitates connectivity with a host device in accordance with an external interconnect standard, such as a USB standard or other standard. For example, the USB 3.0 specification includes nine conductors. To facilitate connectivity according to the USB 3.0 specification data storage device uses a total of at least nine contacts of electrical contacts 212, 214 must be used. For example, two contacts of electrical contacts 212 may be combined with the seven contacts of electrical contacts 214. Using cable that converts the configuration of electrical contacts 212, 214 to conform to a connector defined by an external interconnect standard, such as the USB 3.0 specification, data storage device 200 may be directly connected to a host device using the external interconnect standard.

FIG. 4 illustrates data storage device 300, which provides an alternative configuration for connector array 306 relative to connector array 106 of data storage device 100. In other respects, data storage device 300 is substantially similar to data storage device 100. For brevity, some details of data storage device 300 that are the same or similar to details already discussed with respect to data storage device 100 are not repeated with respect to data storage device 300.

Like data storage device 100, data storage device 300 is compatible with multiple interconnect standards. Data storage device 300 includes a standard SATA connector array 306, including SATA power connector 320 including electrical contacts 322 and standard SATA connector 310 including electrical contacts 312. In addition, connector array 306 includes mini-USB connector 340 to facilitate connectivity according to a USB standard. The use of a mini-USB connector facilitates connectivity between data storage device 300 and a host device using a cable that conforms to a USB standard as opposed to a custom cable as required by data storage devices 100, 200. In other examples, a connector that conforms to a different internal or external interconnect standard may be substituted for mini-USB connector 340.

Figure 5:
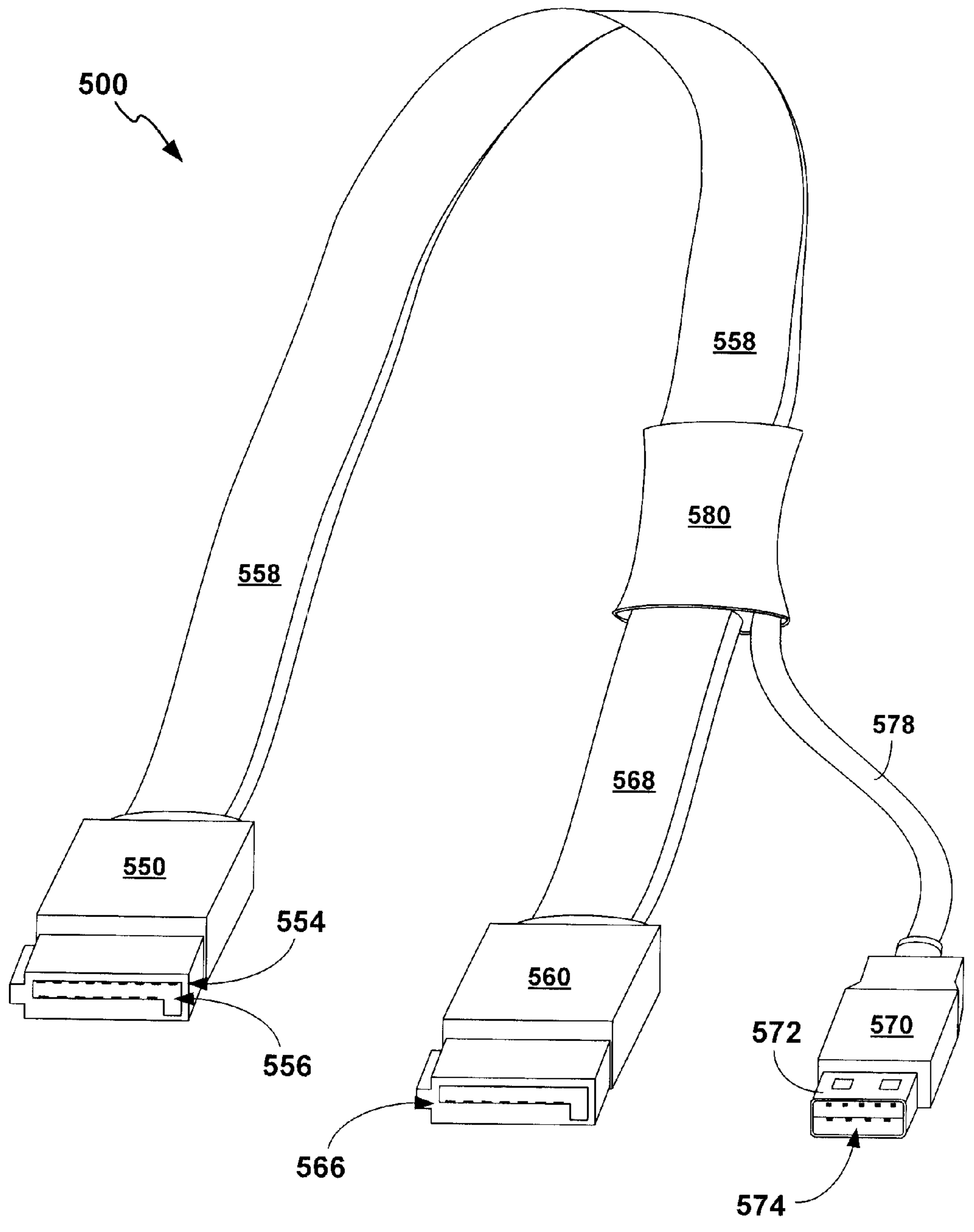
FIG. 5 illustrates a cable that facilitates simultaneous SATA and USB connectivity.

FIG. 5 illustrates cable 500. Cable 500 facilitates simultaneous SATA and USB connectivity between a host and a data storage device, such as data storage device 100 (FIG. 1). Cable 500 includes female connector 550 with electrical contacts 554, 556, standard SATA connector 560 with electrical contacts 566, and standard USB connector 570 with electrical contacts 574 and shield 572.

Female connector 550 is configured to mate with modified SATA connector 110 (FIG. 1) and has a shape that substantially conforms to an internal interconnect standard, such as a SATA standard. Cabling section 558 includes sixteen conductors, one for each of electrical contacts 554, 556. Cabling section 558 extends between female connector 550 and junction 580.

At junction 580, the conductors within cabling section 558 connect to conductors within cabling sections 568, 578. Cabling section 568 includes seven conductors to provide connectivity in accordance with a SATA standard, such as a SATA 6.0 GB/s specification whereas cabling section 578 includes nine connectors in accordance with a USB standard, such as a USB 3.0 specification. The conductors within cabling sections 558, 568, 578 and junction 580 serve to directly connect electrical contacts 554 of connector 550 to electrical contacts 566 of connector 560 and to directly connect electrical contacts 556 of connector 550 to electrical contacts 574 of connector 570.

FIG. 6 illustrates cable 600. Cable 600 facilitates USB connectivity between a host and a data storage device, such as data storage device 100 (FIG. 1). Cable 600 includes female connector 650 with electrical contacts 654 and standard USB connector 670 with electrical contacts 674 and shield 672.

Female connector 650 is configured to mate with modified SATA connector 110 (FIG. 1) and has a shape that substantially conforms to an internal interconnect standard, such as a SATA standard. Female connector 650 does not include contacts according a SATA specification, because such contacts are not necessary for USB connectivity. I.e., in data storage device 100 contacts 112 are configured to provide connectivity according to a SATA specification, but not a USB specification.

Cabling section 658 includes nine conductors to provide connectivity in accordance with a USB specification. The conductors within cabling section 658 serve to directly connect electrical contacts 654 of connector 650 to electrical contacts 674 of connector 670 to facilitate USB connectivity.

Figure 7:
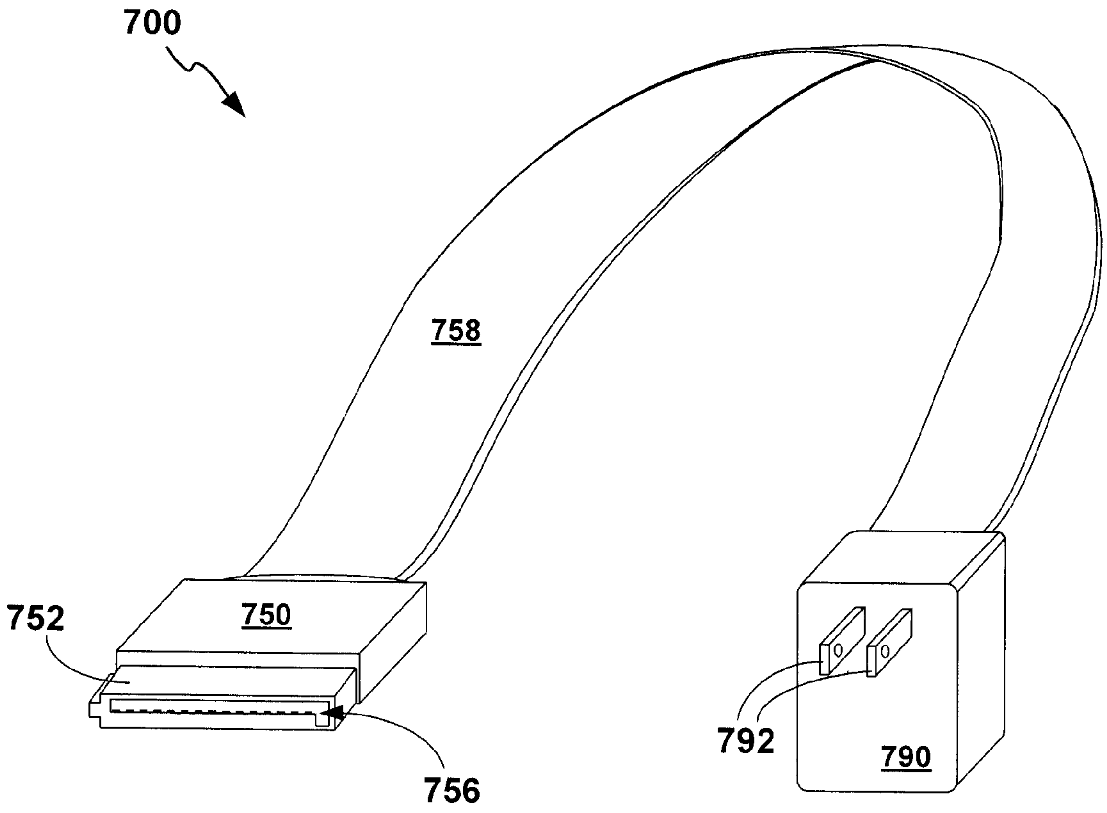
FIG. 7 illustrates a power cable including a SATA power connector, an AC outlet plug and an AC to DC converter.

FIG. 7 illustrates power cable 700. Power cable 700 includes SATA power connector 750, cabling 758, AC to DC converter 790 and outlet prongs 792. Power cable 700 may be used to directly power a device including a SATA power connector, such as connector 120 of data storage device 100 (FIG. 1). While a USB standard includes provisions for power supply, this power supply may be insufficient to power a data storage device such as data storage device 100. With such data storage devices, power cable 700 may be used to power the data storage device when it is operated as an external data storage device in combination with a separate cable that facilitates USB connectivity between the data storage device and a host device. SATA specifications include different voltages for different electrical contacts of electrical contacts 756. AC to DC converter 790 provides different DC voltages to different electrical contacts as provided by the SATA specifications.

Figure 8:
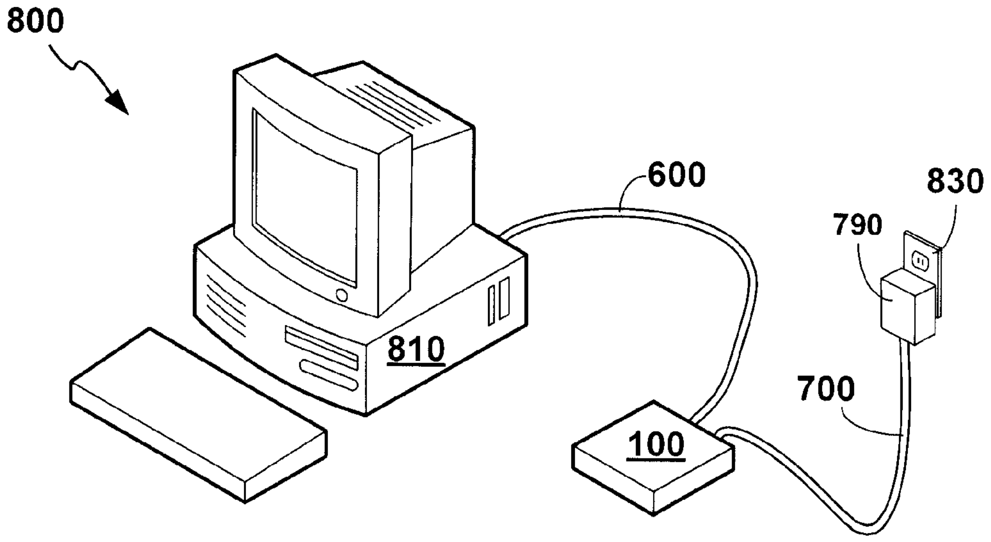
FIG. 8 illustrates a system including the data storage device of FIG. 1 connected to a host computer via the cable of FIG. 6.

FIG. 8 illustrates system 800, which includes data storage device 100 (FIG. 1) connected to host device 810 via cable 600 (FIG. 6). System 800 also includes power cable 700 (FIG. 7), which includes AC to DC inverter (790) plugged into outlet 830. Data storage device is configured to communicate with host device using a USB standard, such as the USB 3.0 specification.

As shown in FIG. 8, host device 800 is a personal computer. In other example, data storage device 100 may be connected to different host devices using an internal or external interconnect standard. Example of suitable host devices include a network devices such as a server, a laptop, a media player or other portable device, a video game console as well as other devices. In this manner, data storage devices that facilitate connectivity according to multiple interconnect standards as described herein are suitable for use in wide variety of devices that include data storage.

Figure 9:
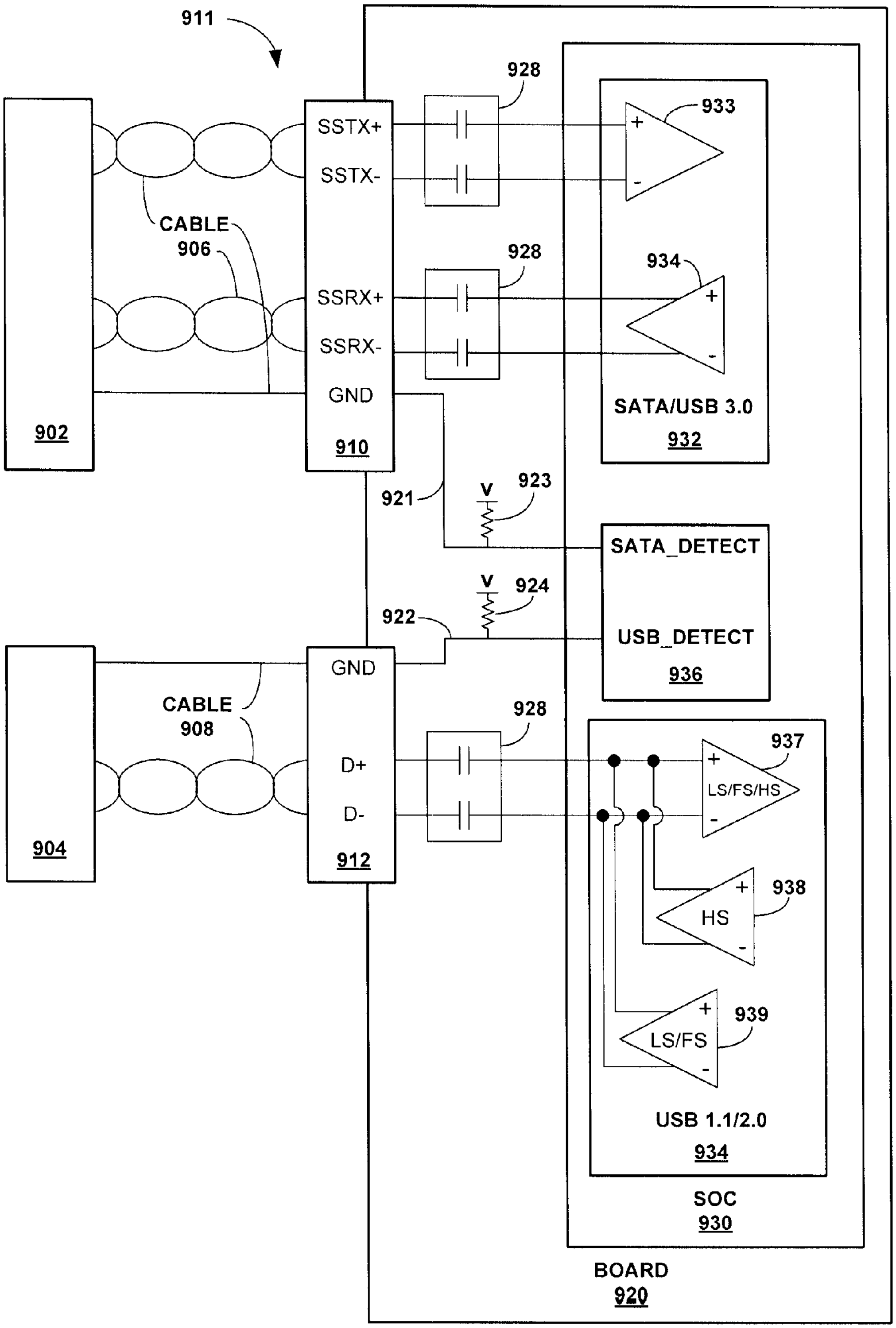
FIGS. 9 and 10 illustrate a data storage device that automatically identifies an interconnect standard of a physical connection with a host device.
Figure 10:
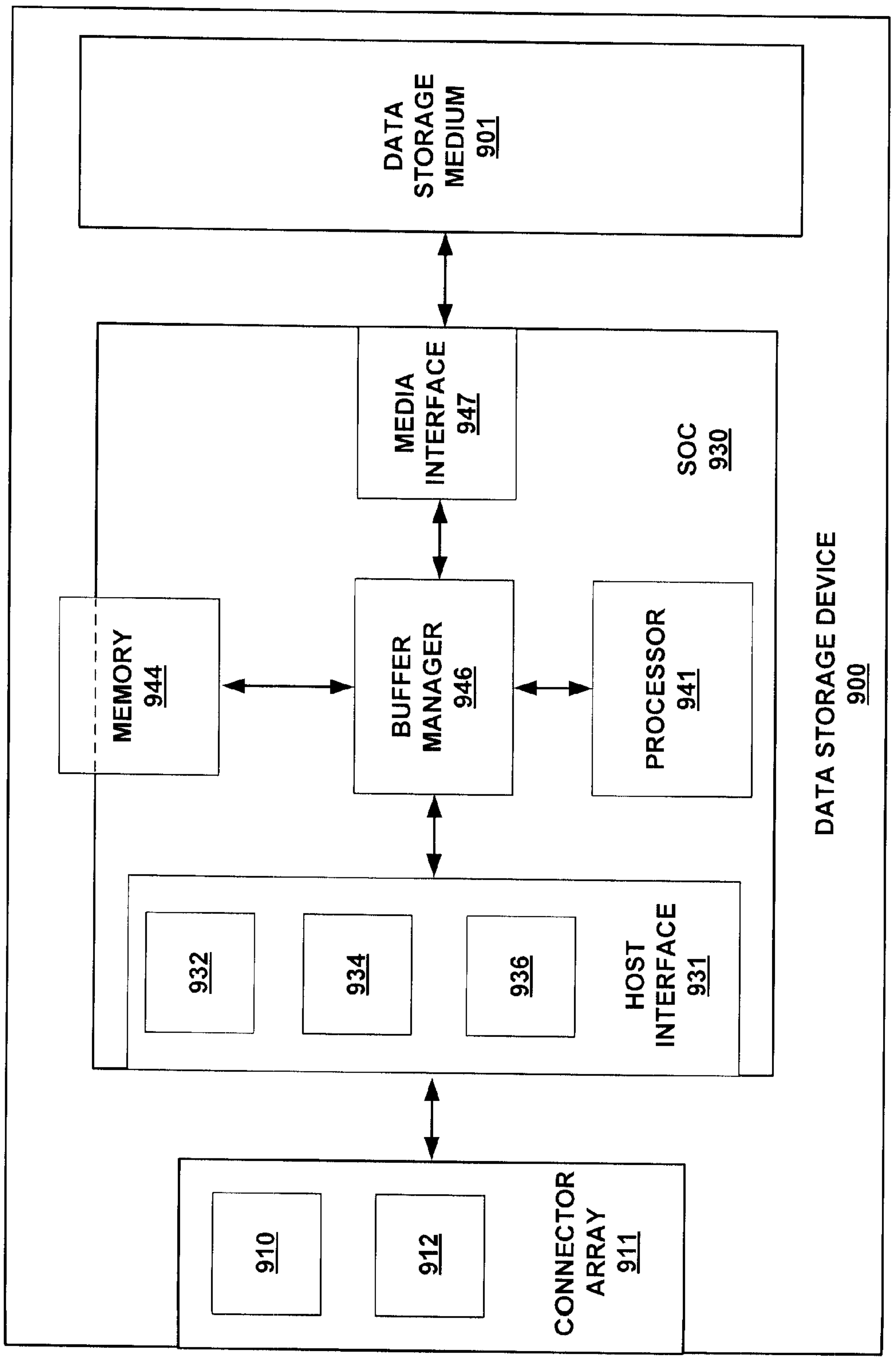

FIGS. 9 and 10 illustrate data storage device 900, which facilitates connectivity according to multiple interconnect standards. Data storage device 900 includes system-on-a-chip (SOC) 930, which includes an interconnect detector to automatically identify an interconnect standard of a physical connection between data storage device 900 and a host device. For example, data storage device 900 may be configured as data storage device 100, data storage device 200 or data storage device 300 (FIGS. 1-4) in order to facilitate physical connectivity according to multiple interconnect standards, such as a SATA standard and a USB standard. Other physical configurations are also possible and are not germane to the interconnect detection features of data storage device 900.

FIG. 9 includes circuit board 920, which may be, e.g., a printed circuit board. Connector array 911, including SATA connector 910 and mini-USB connector 912, is mounted to circuit board 920. A host device (not shown in FIG. 9) may include one or both of connectors 904 and 902 and may be connected to data storage device 900 with cables 906 and 908. As an example, cable 906 may be a standard SATA cable, and cable 908 may be a standard mini-USB cable. Alternatively, a single cable, such cable 500 (for a SATA or USB 3.0 connection) or a standard mini-USB cable (for a USB 1.1/2.0 connection), may be used to connect data storage device 900 to a host device.

SATA electrical connectivity is similar to USB 3.0 electrical connectivity. SATA and USB 3.0 standards include three differential pairs of wires: super speed transmitter differential pair (SSTX), super speed receiver differential pair (SSRX), and differential pair (D). The connections for the differential pairs are shown in FIG. 9 as being divided among connectors 910 and 912. For this reason, SATA and USB 3.0 connectivity with a host device may require connections via both of connectors 910 and 912. In contrast, the USB 1.1 and USB 2.0 standards include only the D pair, which facilitates bi-directional transmissions.

As discussed with respect to FIGS. 1A-1B, the USB 3.0 specification includes 9 conductors. Ground 921 serves as the ground for signal return for USB 3.0 connections, whereas ground 922 serves as the ground for signal return for USB 2.0/1.1 connections. Conductors of the USB 3.0 specification that are not shown in FIG. 9 include the VBUS or voltage power, the ground for power return and the connector metal shield.

Connectors 910, 912 are coupled to circuit board 920 and are configured to provide connectivity with a host device in accordance with at least two distinct interconnect standards. For example, a SATA interconnect standard is distinct from both the USB 1.1 standard and the USB 2.0 standard because SATA interconnect standards are not backwards-compatible with either the USB 1.1 standard or the USB 2.0 standard and because the USB 1.1/2.0 standards are not compatible with SATA standards. The electrical contacts of connectors 910, 912 connect to SOC 930 via traces on circuit board 930. The traces pass through A/C couplers 928, which serve to protect SOC 930 from voltage or current spikes.

The functionality of SOC 930 depicted in FIG. 9 is divided among three modules: SATA/USB 3.0 transceiver 932, USB 1.1/2.0 transceiver 934 and interconnect detector 936, which is configured to determine the presence of a physical connection to the host device and identify an interconnect standard of the physical connection, e.g., SATA/USB 3.0 or USB 1.1/2.0. SATA/USB 3.0 transceiver 932 includes super speed receiver 933 for receiving data from the host device via the SSTX pair and super speed driver 935 for sending data to the host device via the SSRX pair. USB 1.1/USB 2.0 transceiver 934 includes low speed/full speed/high speed receiver 937 for receiving data from the host device via the D pair and high speed driver 938 and low speed/full speed driver 939 for sending data to the host device via the D pair.

Interconnect detector 936 determines the presence of a physical connection with a host device by measuring the voltage of two input traces: trace 921 from the ground connection of connector 910 and trace 922 from the ground connection of connector 912. Trace 921 is electrically coupled to a voltage plane in board 920 or other voltage source via resistor 923. When there is no connection with a host device via connector 910, trace 921 assumes the voltage of the voltage source opposite resistor 923. However, wherein there is a connection with a host device via connector 910, trace 921 assumes the voltage of the ground connection from the host device. Resistor 923 provides a high resistance to limit charge loss from the ground through trace 921. Interconnect detector 936 detects the voltage of trace 921 to determine if there is a connection to a host device via connector 910. In particular, a voltage change from a baseline (positive) voltage to a contrasting voltage (ground) within trace, 921, which is electrically coupled to the ground conductor of connector 910 represents a new connection to a host device via connector 910.

Interconnect detector 936 operates in the same manner to determine if there is a connection to a host device via connector 912. In particular, trace 922 is electrically coupled to a voltage plane in board 920 or other voltage source via resistor 924. When there is no connection with a host device via connector 912, trace 922 assumes the voltage of the voltage source opposite resistor 924. However, wherein there is a connection with a host device via connector 912, trace 922 assumes the voltage of the ground connection from the host device. Interconnect detector 936 detects the voltage of trace 922 to determine if there is a connection to a host device via connector 912. In this manner, interconnect detector 936 determines if there is connection with a host device via one or both of connectors 910, 912 using the voltages of traces 921, 922.

In the configuration shown in FIG. 9, a SATA or USB 3.0 connection may require connectivity with the host device via both connectors 910 and 912, e.g., using cable 500. However, such a connection may or may not include an electrical connection to the host device via the ground of connector 912. For this reason, interconnect detector 936 may simply assume SATA or USB 3.0 connectivity when a ground voltage is detected in trace 921, no matter what voltage is detected in trace 922. Alternately, interconnect detector 936 may look for ground voltages to be detected in both trace 921 and trace 922 before determining the presence of SATA or USB 3.0 connectivity. Once interconnect detector 936 determines there is a connection with a host device via connector 910, 912 or both connectors 910 and 912, SOC 930 may begin corresponding with the host device according to the protocol of the interconnect standard detected by interconnect detector 936.

FIG. 10 illustrates data storage device 900, and includes connector array 911, SOC 930 and data storage medium 901. For example, data storage medium 901 may include one or more magnetic data storage discs, solid state memory or a combination thereof.

Connector array 911 and SOC 930 are the same as shown in FIG. 9. In FIG. 10, the three modules of SOC 930 shown in FIG. 9: SATA/USB 3.0 transceiver 932, USB 1.1/2.0 transceiver 934 and interconnect detector 936, are represented as host interface 931. SOC 930 further includes processor 941, buffer manager 946, memory 944 and media interface 947.

Processor 941 serves to configure SOC 930 at start-up and includes firmware to support the connectivity of the plurality of storage interconnect standards supported by data storage device 900. In other examples, the firmware for processor 941 may be all or partially located separately from SOC 930 on board 920.

Following start-up, buffer manager 946 controls input and output operations with a host device. As one example, buffer manager 946 also controls media interface 947 for reading and writing data to data storage medium 901. In addition, buffer manager 946 uses memory 944 as a cache for input and output data as needed. For example, commonly accessed data may be stored in memory 944 to provide faster response time for data access commands as compared to retrieving data directly from data storage medium 901. Buffer manager 946 may also temporarily store data from the host device in memory 944 prior to writing the data to data storage medium 901 via media interface 947. In different examples, memory 944 may be internal or external to SOC 930. As one example, memory 944 may be DRAM located on circuit board 920.

SOC 930 serves as the controller for data storage device 900. In one example, SOC 930 may receive an indication of the interconnect standard of the physical connection from interconnect detector 936, receive data access commands in accordance with the interconnect standard from the host device via the connector, process the data access commands by accessing data storage medium 901, and send a response to the data access commands in accordance with the interconnect standard to the host via connector array 911.

In a further example, interconnect detector 936 may detect a different interconnect standard, presumably with a different host device, and SOC 930 may correspond with the new host device according to the different interconnect standard. In such an example, interconnect detector 936 may detect voltage change in one or both of traces 921, 922 and associate the second voltage change with the different interconnect standard as discussed in greater detail above. In one example, after a first detecting a voltage indicating a connection via connector 910, trace 921 may return to a baseline voltage, indicating the connection via connector 910 was lost. Then the voltage in trace 922 could change to indicate a new connection via connector 912. SOC 930 would receive an indication of the new interconnect standard from interconnection detector 936. SOC 930 could then correspond via the new connection via connector 912. In this manner, data storage device 900 may be used with a plurality of host devices and a plurality of interconnect standards.

Figure 11:
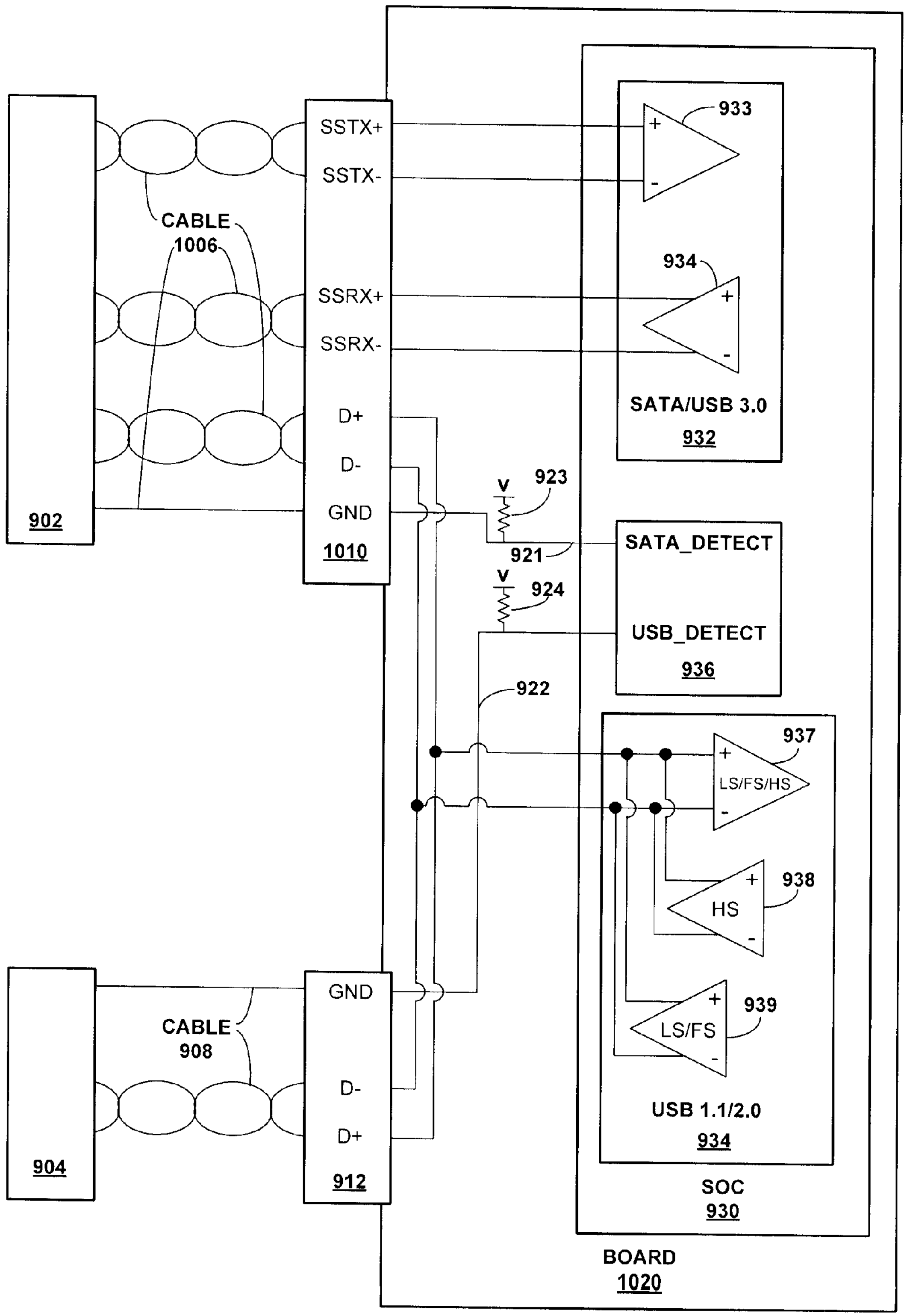
FIG. 11 illustrates a portion of a data storage device including a circuit board that provides an alternative to the circuit board of the data storage device of FIGS. 9 and 10.

FIG. 11 illustrates a portion of a data storage device including circuit board 1020, which provides an alternate configuration to circuit board 920. Components shown in FIG. 11 that include reference numbers in common with those of FIG. 9 are substantially similar to the corresponding components of FIG. 9. For brevity, these components are discussed in limited detail with respect to FIG. 11. In addition, circuit board 1020 includes A/C couplers similar to those shown in FIG. 9, but, for simplicity, the A/C couplers of circuit board 1020 are not shown in FIG. 11.

Circuit board 1020, may be, e.g., a printed circuit board. SATA connector 1010 and mini-USB connector 912 are mounted to circuit board 920. In contrast to SATA connector 910 of FIG. 9, SATA connector 1010 includes electrical contacts for each of the three differential pairs of the SATA and USB 3.0 specifications. This allows a host device connection using a single standard SATA cable. The contacts corresponding to the D pair in SATA connector 1010 are electrically connected to the D pair contacts of mini-USB connector 912 on board 1020. In this manner, SATA connector 1010 and mini-USB connector 912 provide duplicate D pair electrical contacts in order to facilitate electrical connectivity using a standard mini-USB cable (cable 908) or a standard SATA cable (cable 1006). In this manner, circuit board 1020 facilitates multiple interconnect standards, i.e., USB 1.1/2.0 and SATA, using cables that conform to the multiple interconnect standards. In contrast, with circuit board 920, a custom cable, such as cable 500, may have been required to provide SATA connectivity.

The techniques described in this disclosure may be implemented, at least in part, in hardware, software, firmware or any combination thereof. For example, various aspects of the techniques associated with computational components such as SOC 930 may be implemented within one or more microprocessors, digital signal processors (DSPs), application specific integrated circuits (ASICs), field programmable gate arrays (FPGAs), or any other equivalent integrated or discrete logic circuitry, as well as any combinations of such components, embodied in programmers, such as physician or patient programmers, stimulators, or other devices. The terms "processor," "processing circuitry," "controller" or "module" may generally refer to any of the foregoing logic circuitry, alone or in combination with other logic circuitry, or any other equivalent circuitry, and alone or in combination with other digital or analog circuitry.

For aspects implemented in software or firmware, at least some of the functionality ascribed to the systems and devices described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions may be executed to support one or more aspects of the functionality described in this disclosure.

The implementations described above and other implementations are within the scope of the following claims.

The invention claimed is:

1. A data storage device comprising:

a connector array having a first connector corresponding to a first data communications protocol and a different second connector corresponding to a different second data communications protocol; and an external communications interface, comprising:

a first transceiver communicatively coupled to the first connector but not communicatively coupled to the second connector and capable of transferring data via the first data communications protocol;

a second transceiver communicatively coupled to the second connector but not communicatively coupled to the first connector and capable of transferring data via the second data communications protocol; and an interconnect detector coupled to both the first connector and the second connector configured to determine the presence of an external communications link via at least one of the first connector and the second connector and, in turn, to enable either the first transceiver or the second transceiver in relation to the determination.

2. The data storage device of claim 1, wherein the interconnect detector includes a voltage detector that senses when a conductor in the connector corresponding to the interconnect standard is electrically connected to a conductor of the host device.

3. The data storage device of claim 2, wherein the conductor of the host device is a ground conductor.

4. The data storage device of claim 1, wherein the external communications interface includes an internal storage interconnect standard and an external storage interconnect standard.

5. The data storage device of claim 4, wherein the interconnect detector includes:

a first voltage detector that senses when a conductor in the connector corresponding to the internal storage interconnect standard is electrically connected to a conductor of a first host device, wherein the first host device uses the internal storage interconnect standard; and a second voltage detector that senses when a conductor in the connector corresponding to the external storage interconnect standard is electrically connected to a conductor of a second host device, wherein the second host device uses the external storage interconnect standard.

6. The data storage device of claim 4, wherein the connector has a shape that substantially conforms to the internal storage interconnect standard, wherein the connector comprises:

a first set of electrical contacts that substantially conform to the internal storage interconnect standard; and a second set of contacts configured to provide connectivity with the host device in accordance with the external storage interconnect standard.

7. The data storage device of claim 4, wherein the internal storage interconnect standard is a serial advanced technology attachment (SATA) standard, and wherein the external storage interconnect standard is a universal serial bus (USB) standard.

8. The data storage device of claim 4, wherein the internal storage interconnect standard is selected from a group consisting of:

a serial advanced technology attachment (SATA) standard;
a SATA 1.5 gigabytes per second (GB/s) specification;
a SATA 3 GB/s specification;
a SATA 6 GB/s specification;
an Integrated Drive Electronics (IDE) standard;
a Small Computer System Interface (SCSI) standard;
a Serial Attached SCSI (SAS) standard; and
an ultra advanced technology attachment (ultra ATA) standard.

9. The data storage device of claim 4, wherein the external storage interconnect standard is selected from a group consisting of:

a Universal Serial Bus (USB) standard;
a USB 1.0 specification;

a USB 1.1 specification;
a USB 2.0 specification;
a USB 3.0 specification;
an IEEE-1394 (Firewire) standard;
a Fiber Channel (FC) standard;
an Internet SCSI (iSCSI) standard; and
an External SATA (eSATA) standard.

10. The data storage device of claim 1, wherein a controller and the interconnect detector are included in a common integrated circuit.

11. The data storage device of claim 1, further comprising a circuit board, wherein a controller and the interconnect detector are mounted to the circuit board and the connector array is mounted to the circuit board, wherein the connector array substantially conforms to standard connector array for mounting the data storage device in a bay of a laptop computer.

12. The data storage device of claim 1, comprising a data storage medium including a rewriteable magnetic data storage disc with a data storage capacity of at least 10 gigabytes (GB).

13. The data storage device of claim 1, comprising a data storage medium including a solid state memory with a data storage capacity of at least 10 gigabytes (GB).

14. A data storage device comprising:
a connector array having a Serial Advanced Technology Attachment (SATA) connector corresponding to a SATA data communications protocol and a Universal Serial Bus (USB) connector corresponding to a USB data communications protocol; and
an external communications interface, comprising:
a first transceiver communicatively coupled to the SATA connector and capable of transferring data via the SATA data communications protocol;
a second transceiver communicatively coupled to the USB connector and capable of transferring data via the USB data communications protocol; and
an interconnect detector coupled to both the SATA connector and the USB connector configured to determine the presence of an external communications link via at least one of the SATA connector and the USB connector and, in turn, to enable either the first transceiver or the second transceiver in relation to the determination.

15. The data storage device of claim 14, wherein a controller and the interconnect detector are included in a common integrated circuit mounted to the circuit board.

16. The data storage device of claim 14, comprising a data storage medium providing a data storage capacity of at least 10 gigabytes (GB), wherein the data storage medium is selected from a group consisting of:
rewriteable magnetic data storage disc; and
a solid state memory.

17. The data storage device of claim 14, wherein the data storage device is part of an assembly including a host device, and wherein the data storage device is in electrical communication with the host device via at least one of the one or more connectors.

18. The data storage device of claim 14, wherein a host device is a laptop computer, and wherein the one or more connectors substantially conform to standard connector array standard for mounting the data storage device in a bay of the laptop computer.

19. A method comprising:
obtaining a data storage device characterized by a connector array having a first connector corresponding to a first data communications protocol and a different second connector corresponding to a different second data communications protocol, and the data storage device having an external communications interface having a first transceiver communicatively coupled to the first connector and capable of transferring data via the first data communications protocol, the external communications interface further having a second transceiver communicatively coupled to the second connector and capable of transferring data via the second data communications protocol;
connecting an external communications link to the data storage device via at least one of the first and second connectors; and
in response to the connecting step, automatically determining the presence of the external communications link and, in turn, enabling either the first transceiver or the second transceiver in relation to the determination.

20. The method of claim 19, the determining step comprising detecting a change from a first voltage to a baseline voltage within at least one of the first connector and the second connector.

* * * * *